United States Patent Office 3,779,966
Patented Dec. 18, 1973

3,779,966
POLYMERIZABLE WATER-IN-OIL EMULSIONS
Charles Earl Weeks, St. Paul, and Golden Fred Watts, Rosemount, Minn., assignors to Ashland Oil, Inc., Houston, Tex.
No Drawing. Filed Mar. 29, 1971, Ser. No. 129,167
Int. Cl. C08f 45/24
U.S. Cl. 260—29.6 NR                                16 Claims

ABSTRACT OF THE DISCLOSURE

Polymerizable water-in-oil emulsions of thermosettable polyester resins containing cyclic ortho-positioned dicarboxylic acid moieties which can be consistently cured to a water-extended polymer with a copolymerizable vinyl monomer solvent using low cobalt promoter levels in a cure system containing a peroxy-free radical generating catalyst, and an aromatic tertiary amine and a cobalt compound as a copromoters.

INTRODUCTION

This invention relates to polymerizable water-in-oil emulsions. More particularly, the present invention relates to such emulsions prepared from thermosettable polyester resins and copolymerizable vinyl solvent. Still more particularly, the present invention relates to such emulsions which can consistently be cured using a predictable and low level amount of an oil soluble cobalt compound in a standard curing system containing a peroxy-free radical generating catalyst compound, a cobalt compound, and an aromatic tertiary amine, despite the inclusion of cyclic ortho-positioned dicarboxylic acid in the polyester component.

BACKGROUND OF THE INVENTION

Polymerizable water-in-oil emulsions are now well-known in the art. They comprise a discontinuous aqueous phase which is water or an aqueous solution and a continuous polymerizable oil phase which is one or more copolymerizable organic compounds that are immissible with the aqueous phase. It is known that it is important in forming water-filled polymers from water-in-oil emulsions to bring about the polymerization of the oil phase without breaking the emulsion. This was first accomplished by Guenther Will who pioneered such polymerizations. One early writing on water-in-oil emulsions and polymerization thereof is U.S. Pat. 3,256,219 to Guenther Will to which reference is made to facilitate understanding such polymerizations. The polymerization, when accomplished, produces a thermoset water-extended polymer having up to about 95% by weight of water. Depending on the amount of water and other factors, such a water-extended polymer has sufficient polymer present in the cell walls to provide the requisite structural strength for use in preparing shaped articles of diverse application illustrated by boat hulls, storage tanks or containers, in addition to lower requisite strength applications illustrated by lamp and table bases, wall plaques, statuary and other objects d'art.

Although the scope of suitable embodiments from a technically feasible basis is broad, certain embodiments are more desirable, if not essential, from a commercial view point for various reasons. Among these are embodiments providing for a "quick setting" or a "quick cure" to the solid thermoset, water-extended polymer. One highly suitable quick cure system employs a peroxide initiator or catalyst which is activated or promoted by an oil soluble cobalt compound usually co-activated or co-promoted by one or more aromatic tertiary amine compound. Frequently these commercial embodiments involve curing a thermosettable polyester resinous composition comprising a polyester resin and vinyl compound in which the polyester is soluble, such as styrene, by copolymerizing a water emulsion of same.

The polyester resin component is formed from one or more polycarboxylic acids (at least some of which is unsaturated) and polyhydric alcohol. Because they impart increased compressive strength, tensile strength, and resistance to heat distortion to the polymer aromatic acids such as terephthalic acid, isophthalic acid, and/or ortho-phthalic acid (which usually exists in the anhydride form and is commonly called phthalic anhydride and is so hereinafter) are frequently included as an ingredient in the preparation of the polyester resin. Phthalic anhydride is the most abundant of these three as to source, locations, and amount. At least partly due to the foregoing, phthalic anhydride is the most economical. Since the polymer product has similar properties as when the other two isomers are used, phthalic is generally, though admittedly not always, the most desirable for use in such polyesters. Other acids are also added to impart other properties to the polymer as those skilled in the art know. Although not fully understood, polyesters containing significant amounts of phthalic ingredient could not heretofore be consistently cured in water-in-oil emulsions with predictable amounts of cobalt promoter in the aforementioned cure system. We have now found that polyester resins can be prepared which can be consistently cured in water-in-oil emulsions polymerizations with predictable, low levels of cobalt compounds, if not essentially, minimal amounts thereof.

SUMMARY OF THE INVENTION

In one aspect the present invention involves the preparation of a thermosettable polyester resin composition containing cyclic ortho-positioned dicarboxylic acid moieties therein which is curable at about room temperature with a copolymerizable vinyl solvent in water-in-oil emulsions with a curing system containing only about 1.5% by weight or less of cobalt compound promoter (containing about 12% by weight of cobalt ion) by reacting a mixture comprising unsaturated polycarboxylic acid and cyclic ortho-positioned dicarboxylic acid with an excess of polyhydric alcohol to a sufficient extent to provide for an acid number of said polyester of less than about 10, said excess of polyhydric alcohol being sufficient to provide a hydroxyl value of said polyester resin of about 10 to 40 at said final acid number.

In another aspect the present invention involves the preparation of cured water-extended polyester resinous compositions containing cyclic ortho-positioned dicarboxylic acid moieties in said polyester comprising reacting a mixture of unsaturated polycarboxylic acid and cyclic ortho-positioned dicarboxylic acid with an excess of polyhydric alcohol to a sufficient extent to obtain an acid value of less than about 10, said excess polyhydric alcohol being sufficient to obtain a hydroxyl value of about 10 to 40 at said acid number, dissolving said polyester in a copolymerizable vinyl solvent, forming a water-in-oil emulsion of said polyester solution so formed and curing same at about room temperature with a curing system comprising a peroxy-free radical catalyst generating compound promoted by about 1.5% or less by weight of an oil soluble cobalt compound containing about 12% by weight of cobalt ion and an aromatic tertiary amine co-promoter.

DETAILED DISCUSSION

Polymerizable water-in-oil emulsions contain an aqueous phase and a polymerizable oil phase. Generally the weight ratio of aqueous phase to the oil phase is in the range of about 1:3 to 9:1 and preferably about 4:6 to about 7:3.

The discontinuous aqueous phase can be water per se or it can contain up to 75% or preferably up to 25% by weight of other additives which are soluble in the water. Examples of such additives are alcohols, in particular lower monohydric aliphatic alcohols such as methanol, ethanol, and n- and iso-propanol, and n-, iso- and tertiary butanol; lower ethers and lower ketones such as methylethylether and dimethyl ketone; inorganic salts such as sodium chloride, potassium sulfate, sodium sulfate, magnesium sulfate and magnesium chloride. In addition, the aqueous dispersed phase can contain various organic liquids with a high dielectric constant such as formamide and dimethylformamide, or carbohydrates such as saccharose, glucose, and fructose.

The oil phase must be polymerizable and without breaking the emulsion so that phase separation does not occur. One important feature preferred in the accomplishment of this phenomena is the attainment of a stable emulsion wherein the discrete water droplets are less than 1 to 50 microns and preferable predominantly 10 microns or below in size. Another important aspect of accomplishing polymerization to a polymer of desired physical properties without substantial disruption of the emulsion is the cure system. The present invention is directed to the curing aspect of water-in-oil emulsions and particularly to those involving polyester resin components containing phthalic acid or cyclic ortho-positioned dicarboxylic acid moieties. Accordingly, before further discussing the scope of suitable materials and parameters of the present invention, it is desirable to point out certain differences in the cure aspect of thermosettable polyester resins in water-in-oil emulsions as distinguished from the cure of conventional thermosettable polyester resin compositions in the absence of large amounts of water.

Thermosettable polyester resin compositions have for many years been cured using very low levels of cobalt promoters with a peroxy-free radical catalyst generating compound. For example, polyester resin compositions with or without phthalic acid moieties therein having acid values of about 20 and even higher with a hydroxyl value of about 40, have for years been readily cured using a cobalt compound and aromatic tertiary amine promoted peroxy-free radical catalyst generating system containing only about 0.5% by weight of the cobalt compound (containing about 6% by weight of cobalt ion).

In contrast to the above, it is desirable in curing of water-in-oil emulsions (without phthalic acid or similar moieties therein) with a cobalt containing cure system to have about 10 times as much cobalt compound, to have a good emulsion and to achieve cure in a time desired for most commercial operations. On the other hand, when over about 4% by weight of cobalt compound is employed with a polyester resin having the above properties, the polymer has poor color (i.e. it is not white) and other properties are adversely affected unless other additions are also made. It has been found that the properties of the cured polymer are improved with polyesters having acid numbers below about 13 and these lower acid number polyesters can be cured with much less curing system and cobalt compound in particular, although the amount is still much larger than in non-aqueous systems. It is also to be understood that the threshold cobalt level above which the properties (e.g. color) are adversely affected is likewise lower with such resins. However, when phthalic acid or the anhydride is included in the preparation of the polyester, good cure (i.e. polymer properties and in a desirably short time) cannot be consistently obtained with a low level of curing system. More cobalt compound in particular is frequently required. What is particularly perplexing and a more serious problem is that the amount of cobalt required for cure has not been predictable. The cobalt requirement varies from batch to batch. Preparation of water-filled polymers from polymerizable water-in-oil emulsions of polyesters prepared by the inclusion of phthalic acid or the anhydride has not been commercially feasible due to this difficulty.

We have now found that such problems can be obviated so that cure of cyclic ortho-positioned dicarboxylic acid such as phthalic acid moiety containing polyesters can be consistently obtained with curing systems containing about 1.5% of cobalt compound and generally much less. This is accomplished by preparing the polyester compound using an excess of polyhydric alcohol and carrying out the esterification cook until the polyester has an acid value of less than about 10 and hydroxyl value in the range of about 10 to 40. Low acid numbers on this order though broadly taught in conventional polyester art have generally not been prepared because they require more time and expense, yet they have not been necessary to obtain cure and acceptable properties desired in conventional thermoset polyester resinous compositions. Low acid number polyesters are known and sometimes are preferred in special applications (i.e. non-aqueous) unrelated to that here. Nor is such low acid number required when the other positioned polycarboxylic acids are used as ingredients illustrated by terephthalic and isophthalic isomers of phthalic acid in the unique polymerizable water-in-oil art of the present invention.

Acids which can be employed for preparing the polyester resin component through esterification with a polyhydric alcohol are α,β-ethylenically unsaturated diacids, generally of 3 to 36 carbon atoms and preferably of 4 to 8 carbon atoms. The polyesters are essentially linear polymers but are capable of sufficient cross-linking to form a thermoset product through a vinyl monomer provided for by the α,β-ethylene unsaturation. Suitable unsaturated acids include maleic, fumaric, itaconic, and the like. Maleic acid or the anhydride is generally the preferred unsaturated acid. The anhydride form of any suitable acid when it exists is equally as suitable as the acid.

In order to provide increased compressive strength, tensile strength and resistance to heat distortion aromatic acids of the same carbon range, more usually terephthalic acid, isophthalic acid, or phthalic anhydride are included. The aromatic acids are employed in a molar ratio of about 0.5/1 to 5.0/1 of one or more of the acid to the unsaturated acid. Preferably a ratio of these acids of about 1 through 3 on the same basis is employed. As those skilled in the art know, in addition to the aromatics, saturated and unsaturated acids (i.e. other than the α,β-unsaturated acids above) or anhydrides can be included to impart other desired properties such as impact and flexural strength. Saturated compounds can be of cyclic configuration but need not be, and these unsaturated compounds must be cyclic. Examples of the acyclic saturated acids are oxalic, malonic, adipic, succinic, and azelaic. By cyclic ortho-positioned dicarboxylic acid or anhydride is meant both saturated and unsaturated cyclic structures such as tetrahydrophthalic, hexahydrophthalic, chlorendic acid (1,4,5,6,7,7 - hexachloro - 5 - norbornene - 2,3 - dicarboxylic acid), phthalic anhydride and substituted phthalic anhydrides. By substituted phthalic anhydrides is meant compounds of the formula

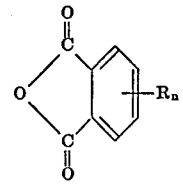

where R is, halogen (i.e. chlorine, bromine, fluorine, and iodine), and alkyl of about 1 through 12 carbon atoms, $n$ is an integer of 1 through 4. The preferred halogen is chlorine. The preferred alkyls are of 1 through 4 carbon atoms. Preferably $n$ is 1 or 2. Examples of substituted phthalics are 3-chloro-1,2-phthalic anhydride; 3,5-dichloro-1,2-phthalic anhydride; 3-bromo-1,2-phthalic anhydride; 3-methyl-1,2-phthalic anhydride; 3,4-dimethyl-1,2-phthalic anhydride; 4-hexyl-1,2-phthalic anhydride; 3-methyl-5-dodecyl-1,2-phthalic anhydride; 3-chloro-4-butyl-1,2-phthalic anhydride; and 3,4,5,6-tetramethyl-1,2-phthalic anhydride. In order that maximum economies be achieved in the practice of this invention, it is preferred that phthalic anhydride be employed to obtain the desired properties imparted by the aromatic acids. The benefits of lowered cobalt cure obtained by the low acid numbers decrease as the amount of phthalic or other cyclic ortho-positioned dicarboxylic acid is decreased. Of course, conversely as the amount of cyclic ortho-positioned diacid is increased, the greater the need for a low acid number and generally for a lower acid number. The present invention, however, has application whenever a significant amount of the phthalic or other cyclic ortho-positioned dicarboxylic acid or anhydride is included.

Other saturated acids which can be included in the practice of this invention are lower and higher carboxylic acids such as benzoic, 2-ethyl hexoic, and trimellitic acid or anhydride. The amounts of such acids, however, are generally to be limited to about 5% or less.

The polyhydric alcohols which can be reacted with the polycarboxylic acids in order to give polyesters useful in the present invention are preferably the dihydric alcohols, examples of which include, among others, ethylene glycol, diethylene glycol, 1,2-propylene glycol, 1,2- or 1,3-dipropylene glycol, 1,3-propylene glycol, 1,3-butylene glycol, 1,2-butylene glycol, neopentyl, glycol, 1,3-pentanediol and 1,5-pentanediol. Higher polyhydric alcohol such as trimethylol propane and pentaerythritol can be used in minor amounts of up to 5% by weight. The anhydrides of the polyhydric alcohols can also be employed.

The polyester is prepared from the polycarboxylic acid and polyhydric alcohol in the conventional and well-known cook esterification. Preferably all the acid and alcohol are charged initially rather than increments in seriatim. Generally a temperature on the order of about 150° to about 220° C. is employed, although preferably a temperature in the range of about 190° to about 215° C. is employed. Preferably an esterification catalyst is included in the reaction. An illustrative example is dibutyltin oxide, although many other suitable catalysts for the practice of the esterification part of the invention are known.

Although the acid number of phthalic and similar structured cyclic acid containing polyesters can approach about 10, as previously mentioned, preferably the acid number is about 8 or less and most preferably is in the range of about 6 through 8. The foregoing acid numbers and those appearing throughout are to be understood as based on any of the well-known titration methods, using potassium hydroxide in a solvent such as acetone, benzene or alcohols. For example, the plastic is dissolved in a mixture of volume of about 50% water and 50% acetone and aqueous KOH is the titrating agent. Another well-known titration technique is one which employs alcoholic potassium hydroxide and a solvent system such as benzene and isopropanol.

The final hydroxyl value of the polyester is to be within the range of about 10 through 40 but preferably is in the range of about 15 through 25. A sufficient excess of polyhydric alcohol is to be used to provide for a hydroxyl number in the foregoing ranges at the attainment of the requisite acid number. This is necessary in order to obtain a polyester having a molecular weight (by end group analysis) of about 1000 to 10,000 and preferably of about 1500 to 50000. Water-extended polymers prepared from polyesters in this weight range have the desired properties for most applications to which these materials are suitable. The excess polyhydric alcohol initially charged usually will not exceed about 20% on a molar basis and preferably is about 4 to 8% on a molar basis where there are no equipment losses. Any excess polyhydric alcohol present after attainment of the desired acid and hydroxyl numbers can be removed, for example, by vacuum at the end of the cook.

The polyester as thus prepared is reacted using the herein described cure system with copolymerizable vinyl compound in which it is soluble illustrated by the following examples: styrene, vinyl toluene, alpha-methyl styrene, acrylonitrile, ethylacrylate, methylacrylate, methylmethacrylate, vinylacetate, triallylcyanurate, diallylphthalate, methylvinylether, and ethylvinylether. Styrene is the preferred sovent because of its cost, availability, and reactivity. Of course, mixtures of ethylenically unsaturated monomers in which one or more styrenes represent the major weight portion of such mixtures are suitable in the practice of the invention. The copolymerizable solvent is employed with the unsaturated polyester in weight ratios of about 10:1 to about 1:10 and preferably about 1:2 to about 2:1. Most preferably the styrene comprises about 5 to 6 parts and polyester about 4 to 5 parts of the polymerizable material.

The cure system comprises a peroxy free radical catalyst generating compound, an oil soluble cobalt compound as a promoter and tertiary aromatic amine as a co-promoter.

The peroxy catalysts to be employed in the present invention are well-known to those skilled in the art. They include organic or inorganic peroxide or hydroperoxide catalysts or mixtures thereof. Some representative catalysts include hydrogen peroxide, methylethylketone peroxide, 2,4-pentanedione peroxide or combinations of it with ditert-butyl peroxide, cyclohexanone peroxide, polymeric ketone peroxides, lauroyl peroxide, cumene hydroperoxide, di-cumyl peroxide, diethyl peroxide, di-tert-amyl peroxide, cyclohexyl hydroperoxide and mixtures of any of the peroxy catalysts. The preferred catalysts are hydrogen peroxide, methylethylketone peroxide, and cyclohexyl peroxide.

As to the amount of the peroxide type catalysts that are employed, generally about 0.1% to 3% or more by weight based on the oil phase of the emulsion. Preferably from about 0.3 to 1.0% on the same basis is employed.

The metal cation in the oil soluble cobalt salt is the active promoter which cooperates with the peroxy catalysts described herein so that the anion portion of the molecule is less critical. (See Oleesky and Mohr, SPI Handbook of Reinforced Plastics, Rheinhold 1964, pages 39-48 and page 48 in particular.) Nevertheless, the preferred cobalt promoters are oil soluble organic salts of carboxylic acids of up to 24 carbon atoms exemplified by cobalt octoate, the neodecanate, tallate, stearate, linoleate, and naphthenate. The most preferred cobalt promoters are cobalt octoate and the neodecanate because of the relatively high weight percent of metal content in those salts.

The cobalt promoter remains distributed throughout the cured thermoset product and thus cannot be routinely recovered for reuse. The cobalt compounds are very expensive by comparison, if not the most expensive, components in these compositions. Accordingly, it is important that the cobalt ion and, consequently, the compound containing same be kept at a low level and, in fact, well below that which is technically suitable in commercial operations in order to achieve significant economies. It is important, therefore, to be able to consistently obtain good cure with predictable low levels of cobalt compound. We have found that consistent good cure can be obtained where the polyester has an acid number no greater than about 10 and a hydroxyl value of about 10 to 40 with a cure system employing no more than about 1.5% by weight of cobalt compound (containing 12% cobalt ion) based on the oil phase; that is, combined weight of polyester and vinyl solvent, even when substantial amounts of cyclic ortho-positioned dicarboxylic acid is included in the polyester. Furthermore, the amount of cobalt compound varies in a direct relationship with the acid number in the specified ranges when the hydroxyl value is kept fixed (and within the specified ranges). Therefore, as the acid value is decreased the requisite amount of cobalt promoter decreases. In order to reduce the requisite amount of cobalt further, preferably the polyester is prepared so as to have an acid number of about 8 or below. At such acid numbers consistent good cure can be obtained with about 1–1.5% by weight of cobalt promoter and typically much less, on the order of about 1% of cobalt compound. Although decreasing the acid number of the polyester is accomplished at some additional expense, we prefer a polyester with an acid number in the range of about 6 through 8. Polyesters with the latter acid numbers can be consistently cured in a short time and have good polymer properties when cured with about 0.75% to about 1.0% of cobalt compound, although about 1% or slightly more is generally to be preferred in commercial operations. It is, of course, readily appreciated by those skilled in the art that when a cobalt compound containing more or less than 12% cobalt ion is employed, a correspondingly larger or smaller amount of the cobalt compound is to be employed so as to provide the same amount of cobalt ion as set forth hereinabove.

The co-promoters with the cobalt compound are aromatic tertiary amines. Because of their structure these amines apparently hold the unshared pair of electrons on the nitrogen atom of the amine sufficiently loosely for making said electrons available for coordinating with cobalt and/or for entering into free radical reactions. Accordingly, amines which contain substituted phenyl groups which permit the unshared electrons to coordinate or react in the above-described manner are considered to be the equivalent of those amines which have an unsubstituted phenyl group. Indeed, substitution in the phenyl group may enhance the activity of the amine, as in the case of a methyl group located meta to the carbon atom of the N-phenyl bond. By way of example and not limitation, other groups such as alkoxy (e.g. methoxy) and halogen (e.g. chloro and fluoro) are also useful substituents for inclusion in the phenyl group. Thus, for purposes of the present specification and claims, the term phenyl should be interpreted as including substituted phenyl. Illustrative examples of such amines which are also commercially available, or have been described in the literature, are dimethyl aniline (DMA), N,N-diethyl aniline, N,N-dimethyl-p-toluidine. The preferred amine is DMA. The hydroxyalkyl substituted tertiary aromatic amines of U.S. Pat. 3,367,994 and Kodak Eastman Chemicals Technical Data Publication TDS No. D-129 can also be employed. The amines taught in those publications are incorporated herein. The amine co-promoters are generally used in a weight ratio of about 0.1 to 3.0 preferably about 0.3 to 1.5 based on the weight of the cobalt compound.

Although the cobalt compounds are employed as a promoter and also act as emulsifiers, an added emulsifier can be included. This is particularly so when open celled polymers are desired. A number of emulsifying agents are applicable for this purpose. Among such suitable agents are the polymeric types disclosed in U.S. Pat. No. 3,256,219, namely, the essentially hydrophobic polymerization products including polycondensates containing a quantum of hydrophilic groups capable of imparting a requisite degree of interfacial surface tension between the oil and aqueous phases, all as described in said patent. Representative of the functional groups capable of imparting a requisite degree of hydrophilic characteristics to the polymeric agent are such as carboxyl, carboxylate, carboxamide, hydroxyl, ether, amino, ammonium, sulfonic, sulfonate, and sulfoxide groups. A specific example of the foregoing type of emulsifier is a copolymerization product of acrylic acid and styrene having a molecular weight in the range of 20,000 to 200,000 and an acid number of the order of about 10. Further examples of applicable polymeric emulsifying agents include the polymerization and copolymerization products of methyl methacrylate and vinyl acetate prepared by emulsion polymerization in the presence of a persulfate. Still other suitable emulsifiers include the lipophilic type agents as exemplified by the class of monionic polyhydric-fatty acid esters. An enumeration of such esters include sorbitan mono-stearate, sorbitan mono-oleate, propylene glycol mono-laurate, glycerol mono-stearate, diethylene mono-oleate, etc. Polyester prepared solely from saturated acids and polyhydric alcohols described herein can be admixed with the polyester prepared containing unsaturated acid to impart variations in flexural and other physical properties that may be desired. Such embodiments can be included in the practice of the present invention.

The good cure times effected by the cure system described hereinabove will now be discussed to further enhance the understanding of the present invention and the advantages of employing low acid number polyesters when they contain ortho-positioned cyclic dicarboxylic acids.

An emulsion is formed by first dissolving a suitable polyester resin in a copolymerizable vinyl monomer. The cobalt compound promoter and tertiary aromatic amine copromoter can be conveniently added to this solution. This is commonly called a pre-promoted resin or plastic. As those skilled in the art know, polymerization does not occur with the catalyst alone unless heated; that is, until both catalyst and a promoter are present with the polymerizable oil phase. Examples of stabilizers or inhibitors for use in the compositions of this invention are bulk inhibitors hydroquinone and tert. butyl catechol and vapor phase inhibitors 2,6-ditert-butyl-p-cresol and butylated hydroxy anisole. An emulsion of the foregoing solution is then formed with water by some (e.g. high shear) mixing. The peroxide catalyst is conveniently added to the water before mixing it with the oil phase. When the combination is complete, the curing begins and passes through several more or less distinct stages or phases. There is normally an initial period during which the emulsion, though beginning to polymerize, is still "mobile"; that is, it may be stirred. Gelation follows; that is, the emulsion becomes immobile. This change often occurs abruptly, sometimes gradually. Stirring and pouring are no longer possible after gelation. However, the physical properties of the gelled material, especially tensile strength and dimensional stability, normally fall far short of the ultimate capabilities of the raw materials. The properties develop during a continuation of the polymerization subsequent to gelation is marked by a rising temperature in the emulsion due to the exothermic nature of the polymerization. After the temperature reaches a maximum, referred to as "peak exotherm," and the thermoset emulsion has cooled, physical testing normally discloses tensile and dimensional properties far exceeding those of the gelled material.

When the emulsions are employed in making shaped objects, as is often the case, the polymerization normally takes place with the emulsion in contact with a shaping member or mold. Production capacity with a given number of molds is influenced by the time consumed in the polymerization, and various terms are employed to identify the elapsed time in the various stages of polymerization mentioned above. Thus, "gel time" or GT refers to the time elapsed between commencement of polymerization and gelation of the emulsion. The instant when gelation has occurred normally can readily be determined manually by repeatedly and gently dipping a probe, e.g. a stirrer or tongue depressor, into the polymerizing emulsion. When the emulsion resists penetration by the probe, it has gelled. When the gelation occurs gradually, commercially available gel time measuring devices may prove useful. The elapsed time from the moment of gelation to "peak exotherm" is referred to as "gel to peak exotherm." For most commercial operations a gel to peak exotherm of about 5 to 15 minutes is generally desired.

It is desired to point out at this time that while total cure time is important, the gel to peak exotherm is much more important commercially. The reason for this is that some short time lapse before gel is required by a fabricator or processor making shaped articles in order for him to get his mold filled and obtain good detail in the article. Once the threshold of acceptable short cure times for commercial operations is achieved, the gel stage may be retarded when desired by standard known inhibitors (e.g. hydroquinone or butylated hydroxy anisole). Even in those cases, however, where a longer gel time is desired, for example, where the mold is relatively large, once it has been poured and been able to fill the mold in detail, the shorter the time to peak exotherm the better. Thus, although the low acid number polyesters of this invention may on occasion cure slightly slower than higher acid numbers, the cure times and gel to peak exotherm are well within acceptable limits; but, in addition, good cure can be consistently obtained with predictable low level amounts of cobalt promoter. A customer buying the unpromoted resin can be certain of obtaining good cure with a stock promoter system without adjusting it to the particular resin shipment. He is in turn able to maintain better quality control of his products, all of the foregoing being highly desirous. Employing the low acid number discovery of the present invention provides consistent cure and such a gel to peak exotherm time with the levels of promoters taught herein. Unless the cobalt promoter level for the resin is sufficient, an adequately highly peak exotherm and good cure through to the desired polymer properties is not obtained.

It is apparent that many modifications and variations of the invention as hereinbefore set forth may be made without departing from the spirit and scope thereof. The examples are thus given by way of illustration only.

EXAMPLES

General procedure

Using conventional laboratory equipment for carrying out a polyester cook comprising a 2-liter glass flask equipped with heating means, a thermometer, a stirrer, a nitrogen sparge tube, a fractionating column with a condenser, and a water removal head connected to the top of the column, a series of experiments were carried out according to the following procedure. To the pot was charged a mixture of unsaturated acid, phthalic anhydride, and one or more glycols. The mixture was then heated to a temperature sufficient to solubilize the mixture (usually about 120°–150° C.) at which time a catalyst (usually dibutyl tin oxide) was added and the entire mixture heated to reaction temperature for a period of about 15 to 25 hours. A nitrogen sparge rate in the range of about 0.2 to 1.2 ft.$^3$/hr./gallon. At the start of the cook the sparge rate was always at the low end of the range and it was increased to the upper end towards the end of the cook. During the cook toluene or xylene was added when the still-head temperature dropped to about 85°–90° C. and the cook was completed using the standard azeotrope technique.

The polyester was checked for acid number (A.N.) by both the toluene/alcoholic KOH (Alc.-KOH) and acetone/aqueous KOH (H$_2$O-KOH) titration methods described elsewhere herein (although in the acetone-aqueous KOH technique here the sample was refluxed with the KOH for two hours to insure breaking the anhydride). Also the polyester was checked for hydroxyl value (OH number) which was determined and corrected by adding the acid number thereto.

A styrene solution of the polyester was prepared employing 60% by weight in each case of styrene (inhibited with a few parts per million of a standard inhibitor) and 40% of the ester to which solution a small amount of a standard stabilizer was added.

The styrene solution was mixed with about 50% by weight of water in each case, about ½% by weight of a water-dispersible type of methyl ethyl ketone catalyst (Lupersol DWS-Wallace & Tiernan Co.) and a promoter system of dimethyl aniline (D.M.A.) and cobalt octoate (Co.) in the amounts set forth below to form an emulsion. The mixing to form an emulsion was carried out using a high shear mixer. The viscosity of the emulsion (E.V.) was determined (centipoise scale) in each case with a Brookfield viscometer.

The gel time (G.T.) and gel to peak exotherm (G.P.E.) was recorded in minutes.

The peak exotherm temperature (P.E.) during the cure was recorded in degrees F.

EXAMPLES 1–8

The charge in these examples were as follows:

| Examples | 1 and 2 | 3 and 4 | 5 and 6 | 7 and 8 |
|---|---|---|---|---|
| Maleic acid, mol | 1.0 | 1.0 | 1.0 | 1.0 |
| Phthalic anhydride, mol | 2.5 | 2.5 | 2.5 | 2.5 |
| Diethylene glycol, mol | 1.767 | 1.82 | 0 | 0 |
| Dipropylene glycol, mol | 1.767 | 1.82 | 0 | 0 |
| Propylene glycol, mol | 0 | 0 | 3,605 | 3.85 |

The glycols charged in Examples 1 and 2 represent a 1%, in Examples 3 and 4 a 4%, in Examples 5 and 6 a 3%, and in Examples 7 and 8 a 10% molar excess. The various parameters of the polyester and the cure of the water-in-oil emulsions are shown in the table.

| Example number | A.N. H$_2$O-KOH | A.N. Alc-KOH | OH number (corrected) | Promoters (percent by wt.) DMA | Co. | E.V. (centipoise) | G.T. (minutes) | G.P.E. (minutes) | P.E. (° F.) | Remarks |
|---|---|---|---|---|---|---|---|---|---|---|
| 1 | 15.1 | 13.1 | 9±2 | 0.5 | 1.25 | 380 | 5.7 | 13.0 | 199 | White polymer. |
| 2 | 15.1 | 13.1 | 9±2 | 0.5 | 2.0 | 450 | 2.4 | 10.0 | 200 | White polymer but faster cure than in Example I. |
| 3 | 6.0 | 6.4 | 21±1 | 0.5 | 1.25 | 370 | 5.6 | 16.0 | 198 | White polymer. |
| 4 | 6.0 | 6.4 | 21±1 | 0.5 | 2.0 | 370 | 5.3 | 17.0 | 198 | No improvement in cure time and the polymer was brown showing cobalt level to be excess. |
| 5 | 18.0 | 13.6 | 0–5 | 0.5 | 1.25 | | | | | Did not gel. |
| 6 | 18.0 | 13.6 | 0–5 | 0.5 | 2.0 | 715 | 2.1 | 14.5 | 191 | Gel and cure to a white polymer obtained. |
| 7 | 6.4 | 5.3 | 21±1 | 0.5 | 1.25 | 530 | 5.4 | 15.0 | 198 | White polymer. |
| 8 | 6.4 | 5.3 | 21±1 | 0.5 | 2.0 | 580 | 5.4 | 16.3 | 192 | No improvement in cure time and the polymer was brown showing cobalt level to be in excess. |

Having now described the invention, many ramifications and modified embodiments will readily occur to those skilled in the art. Insofar as such variations do not depart from the spirit and scope of the invention described in this application, they are intended to be embraced by the appended claims in their broadest construction.

We claim:

1. Process for preparation of cured water-extended polyester resinous compositions containing cyclic ortho-positioned dicarboxylic acid moieties in said polyester wherein said cyclic ortho-positioned dicarboxylic acid moiety conforms to the corresponding acid or anhydride structure selected from the group consisting of tetrahydrophthalic, hexahydrophthalic, chlorendic acid, phthalic anhydride and a substituted phthalic anhydride of the formula:

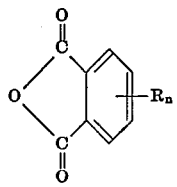

wherein R is selected from the group consisting of halogen and alkyls of 1 to 12 carbon atoms, and where $n$ is an integer of 1 through 4, and in which cure is consistently achieved by low levels of cobalt promoter comprising reacting a mixture of aliphatic $\alpha,\beta$ - unsaturated polycarboxylic acid and about 0.5/1 to 5/1 mols based on said $\alpha,\beta$ - unsaturated polycarboxylic acid of a cyclic ortho - positioned dicarboxylic acid with an excess of aliphatic polyhydric alcohol under conditions to provide for an acid value of about 10 or below, said excess polyhydric alcohol being sufficient in amount to obtain a hydroxyl value of about 10 to 40 at said acid number, dissolving said polyester in a copolymerizable monoethylenically unsaturated vinyl solvent in a weight ratio of said polyester to said copolymerizable monomer solvent of about 10/1 to 1/10, forming a water-in-oil emulsion of said polyester solution so formed and curing said water-in-oil emulsion without breaking same at about room temperature with a curing system comprising about 0.1 to 3% by weight based on the oil phase of a peroxy free radical catalyst generating compound promoted by no more than about 1.5% by weight of an oil soluble cobalt salt promoter compound wherein said cobalt salt promoter is the salt of a carboxylic acid of up to 24 carbon atoms containing about 12% by weight of cobalt ion and a carbocyclic aromatic tertiary amine co-promoter in a weight ratio of about 0.1 to 3 based on said cobalt compound.

2. Process according to claim 1 wherein the esterification is carried out to a sufficient extent to obtain a polyester with an acid number of about 8 or less.

3. Process according to claim 2 wherein the polyester has an acid number in the range of about 6 to 8.

4. Process according to claim 3 wherein the polyester has a hydroxyl value in the range of about 15 to 25.

5. Process according to claim 4 wherein the major amount of said unsaturated polycarboxylic acid is maleic acid.

6. Process according to claim 5 wherein the major amount of said cyclic ortho-positioned dicarboxylic acid is phthalic acid in the anhydride form.

7. Process according to claim 6 wherein the major amount of said copolymerizable solvent is styrene in a weight ratio of polyester to styrene of about 1/2 to 2/1.

8. Process according to claim 4 wherein the curing system contains about 1-1½% by weight, based on the solution of said polyester and said copolymerizable vinyl monomer solvent, of a cobalt compound promoter.

9. Process according to claim 8 wherein the major amount of said copolymerizable solvent is styrene in a weight ratio of polyester to styrene of about 1/2 to 2/1.

10. Process according to claim 7 wherein the cure system contains about 1% by weight, based on the solution of said polyester and said copolymerizable vinyl monomer solvent, of cobalt compound promoter.

11. Process according to claim 10 wherein said aromatic tertiary amine co-promoter is present in a weight ratio of about 0.3 to 1.5 based on said cobalt compound.

12. Process according to claim 8 wherein said aromatic tertiary amine co-promoter is present in a weight ratio of about 0.3 to 1.5 based on said cobalt compound.

13. Process according to claim 12 wherein said aromatic amine is dimethyl aniline.

14. Process according to claim 13 wherein the peroxy free radical generating catalyst is selected from hydrogen peroxide methyl ethyl ketone, cyclohexyl peroxide or mixtures thereof.

15. A process according to claim 13 wherein said peroxy free radical catalyst generating compound is hydrogen peroxide.

16. Process for preparation of cured water-extended polyester resinous compositions according to claim 5 wherein the cyclic ortho-positioned dicarboxylic acid moieties in said polyester conform to a substituted phthalic anhydride of the formula:

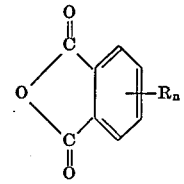

wherein R is selected from the group consisting of chlorine and alkyls of 1 through 4 carbon atoms, and wherein $n$ is 1.

References Cited
UNITED STATES PATENTS

| | | | |
|---|---|---|---|
| 3,091,936 | 6/1963 | Lundberg et al. | 260—863 |
| 3,297,788 | 1/1967 | Dun et al. | 260—863 |
| 2,855,373 | 10/1958 | Guenther | 260—863 |
| 3,256,219 | 6/1966 | Will | 260—29.6 N |
| 3,548,029 | 12/1970 | Stahly et al. | 260—863 |
| 3,555,116 | 1/1971 | Stahly et al. | 260—863 |
| 3,367,994 | 2/1968 | Parker et al. | 260—864 |
| 2,719,132 | 9/1955 | Schweitzer | 260—863 |
| 3,333,020 | 7/1967 | Howald | 260—863 |

HAROLD D. ANDERSON, Primary Examiner

U.S. Cl. X.R.

260—17.4 SG, 861, 862, 863, 864, 868, 872

UNITED STATES PATENT OFFICE
CERTIFICATE OF CORRECTION

Patent No. 3,779,966     Dated December 18, 1973

Inventor(s) Charles E. Weeks and Golden F. Watts

It is certified that error appears in the above-identified patent and that said Letters Patent are hereby corrected as shown below:

In Column 2, line 45; "polyphydric" should be corrected to --polyhydric--.

In Column 5, line 68; "50,000" should be corrected to --5,000--

In Column 6, line 10; "sovent" should be corrected to --solvent--.

In Column 7, line 72; "of the order" should be corrected to --in the order--

In Column 10, line 34; "3,605" should be corrected to --3.605--.

Signed and sealed this 1st day of October 1974.

(SEAL)
Attest:

McCOY M. GIBSON JR.
Attesting Officer

C. MARSHALL DANN
Commissioner of Patents